United States Patent
Diop

(10) Patent No.: US 9,240,655 B2
(45) Date of Patent: Jan. 19, 2016

(54) AUTOMATIC SPLICE HAVING A MAGNETIC INDICATOR

(71) Applicant: Hubbell Incorporated, Shelton, CT (US)

(72) Inventor: Seydou Diop, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/153,436

(22) Filed: Jan. 13, 2014

(65) Prior Publication Data

US 2014/0273610 A1 Sep. 18, 2014

Related U.S. Application Data

(60) Provisional application No. 61/794,578, filed on Mar. 15, 2013.

(51) Int. Cl.
| | |
|---|---|
| *H01R 3/00* | (2006.01) |
| *H01R 13/641* | (2006.01) |
| *H01R 4/50* | (2006.01) |
| *H01R 11/09* | (2006.01) |
| *H02G 1/14* | (2006.01) |

(52) U.S. Cl.
CPC ............ *H01R 13/641* (2013.01); *H01R 4/5083* (2013.01); *H01R 11/09* (2013.01); *H02G 1/14* (2013.01)

(58) Field of Classification Search
CPC ............................ H01R 13/641; H01R 4/5083
USPC ........... 439/491, 345, 485, 863, 370, 38, 820, 439/489; 174/84 R, 85; 24/136
See application file for complete search history.

(56) References Cited

U.S. PATENT DOCUMENTS

| | | | | |
|---|---|---|---|---|
| 1,997,649 A | | 6/1933 | Ohlund | |
| 2,138,913 A | | 1/1936 | Fotsch | |
| 2,199,283 A | | 3/1938 | Cook | |
| 2,215,072 A | | 9/1940 | Rogoff | |
| 2,217,978 A | | 10/1940 | Becker | |
| 2,463,145 A | | 3/1949 | Buchanan | |
| 2,554,387 A | | 5/1951 | Saul | |
| 2,572,940 A | | 10/1951 | Lockhart | |
| 3,072,989 A | | 1/1963 | Jugle | |
| 3,205,300 A | | 9/1965 | Becker | |
| 3,345,454 A | * | 10/1967 | Mixon, Jr. ................ | H01R 4/08 174/84 R |
| 3,681,512 A | * | 8/1972 | Werner .................... | H01R 4/08 102/202.9 |
| 3,689,866 A | * | 9/1972 | Kelly ............................ | 439/488 |
| 3,852,850 A | * | 12/1974 | Filhaber .................. | F16G 11/04 24/115 M |
| 4,362,352 A | * | 12/1982 | Hawkins ................... | H01R 4/52 174/90 |
| 4,698,031 A | * | 10/1987 | Dawson .................. | F16G 11/04 439/863 |

(Continued)

*Primary Examiner* — Abdullah Riyami
*Assistant Examiner* — Nader J Alhawamdeh
(74) *Attorney, Agent, or Firm* — Michael Best & Friedrich, LLP

(57) ABSTRACT

A cable connector includes a body member having a first opening to receive a cable and a second opening. An indicator is received in the second opening and is movable between exposed and unexposed positions. A magnet is disposed in the body member and is aligned with the second opening. A support member is movable between first and second positions. When the support member is in the first position, the support member is disposed between the magnet and the indicator such that the indicator is in the exposed position. When the support member is in the second position the support member is withdrawn from between the magnet and the indicator such that the magnet moves the indicator to the unexposed position to indicate full insertion of the cable.

20 Claims, 18 Drawing Sheets

(56) References Cited

U.S. PATENT DOCUMENTS

| | | | | |
|---|---|---|---|---|
| 5,039,193 A * | 8/1991 | Snow | ................. | G02B 6/262 385/25 |
| 5,278,353 A * | 1/1994 | Buchholz | ................. | F16G 11/04 174/84 R |
| 5,334,056 A * | 8/1994 | Hlinsky | ................. | F16G 11/04 439/820 |
| 5,369,849 A * | 12/1994 | De France | ............. | F16G 11/04 24/115 M |
| 5,401,175 A * | 3/1995 | Guimond | .......... | H01R 13/6205 439/38 |
| 5,600,096 A * | 2/1997 | Cherry | ................. | H01R 4/50 174/84 R |
| 7,361,045 B1 | 4/2008 | Vinciguerra et al. | | |
| 7,972,168 B2 * | 7/2011 | Su | ........................ | H01R 13/502 439/491 |
| 7,988,484 B1 | 8/2011 | Jacoby | | |
| 2007/0074378 A1 * | 4/2007 | Tamm | ................. | F16G 11/04 24/136 L |
| 2009/0215307 A1 * | 8/2009 | Hughes | ................. | H01R 13/53 439/489 |
| 2009/0298358 A1 * | 12/2009 | Tamm | ..................... | H01R 4/52 439/863 |
| 2011/0002795 A1 * | 1/2011 | Brookbank | ............ | F04B 47/06 417/63 |
| 2011/0034051 A1 * | 2/2011 | Kumar | ................. | H01R 13/53 439/186 |
| 2011/0183539 A1 * | 7/2011 | Gaertner | ............. | H01R 13/641 439/345 |
| 2012/0028498 A1 * | 2/2012 | Na | ........................ | G09F 3/205 439/491 |
| 2012/0217062 A1 * | 8/2012 | Cawood | ................. | H01R 4/52 174/84 R |
| 2013/0011102 A1 * | 1/2013 | Rinzler | ............... | G02B 6/4296 385/89 |
| 2013/0310745 A1 * | 11/2013 | Latham | ................. | A61M 5/20 604/131 |

\* cited by examiner

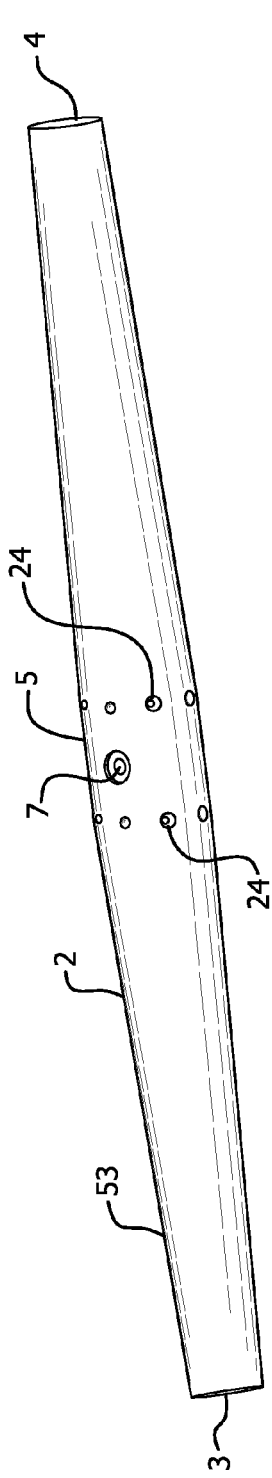
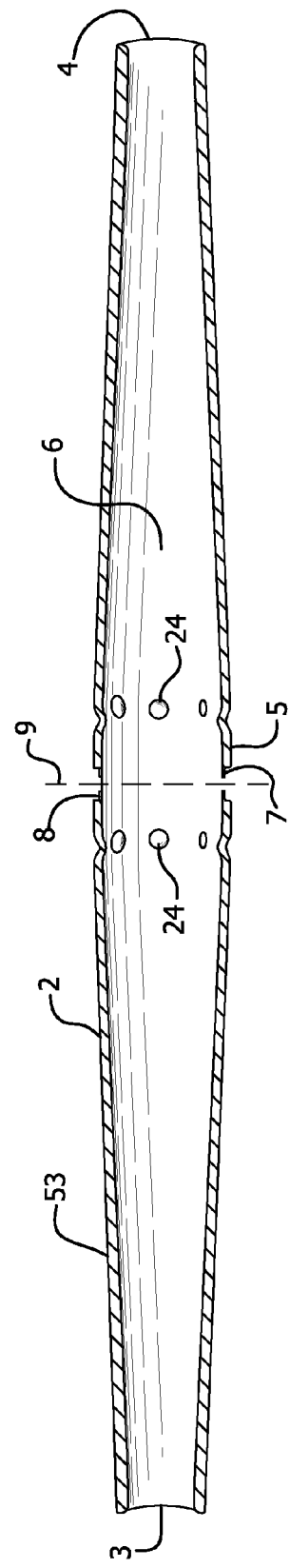

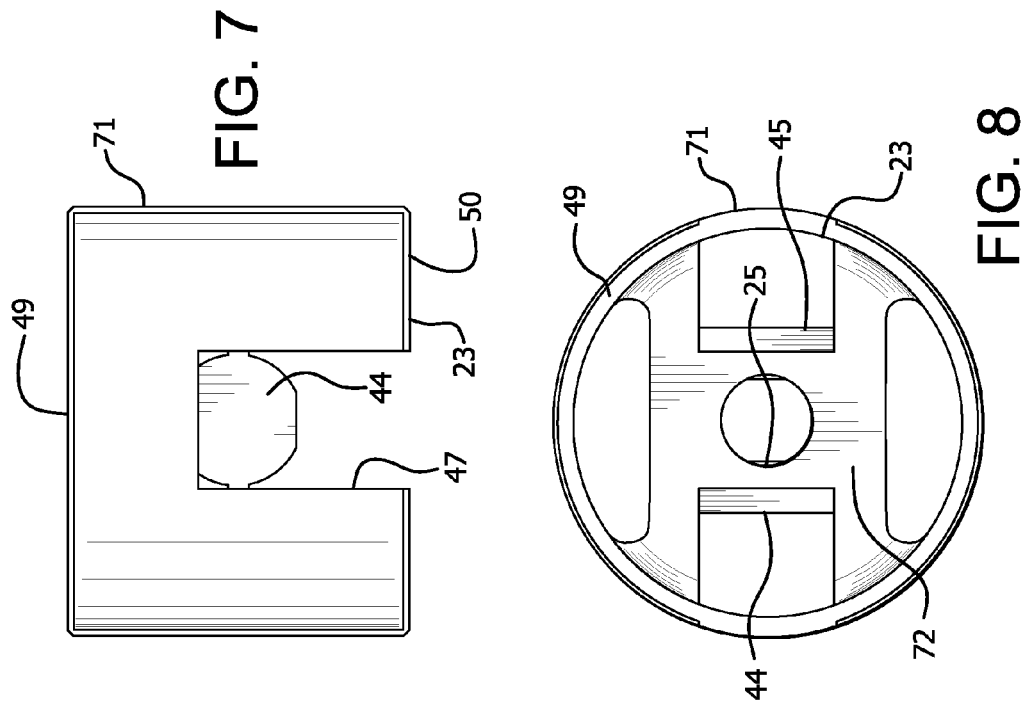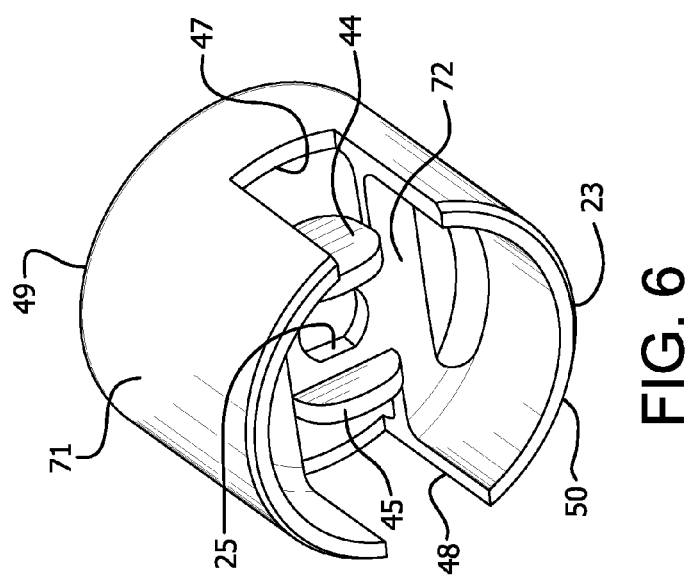

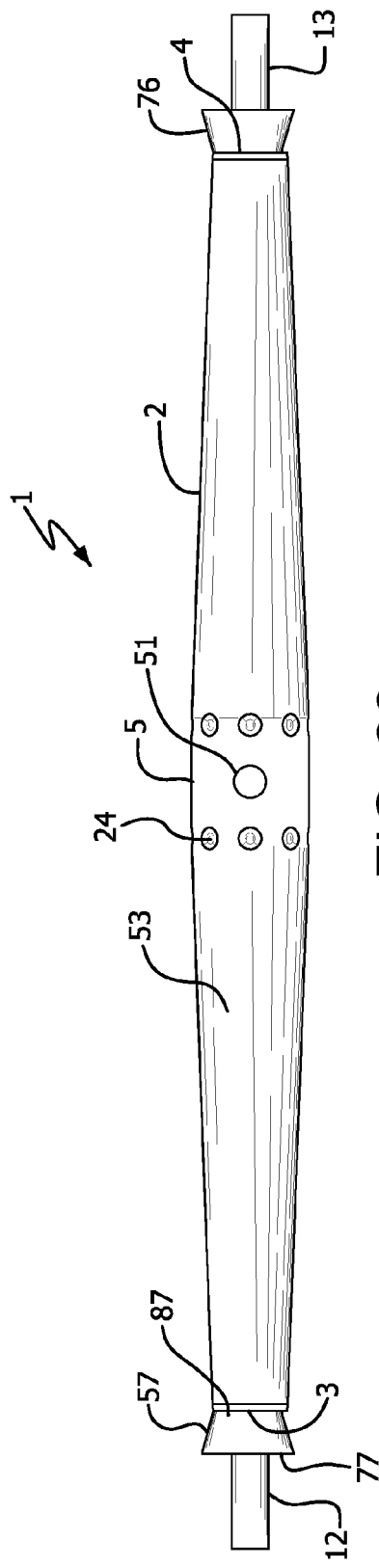
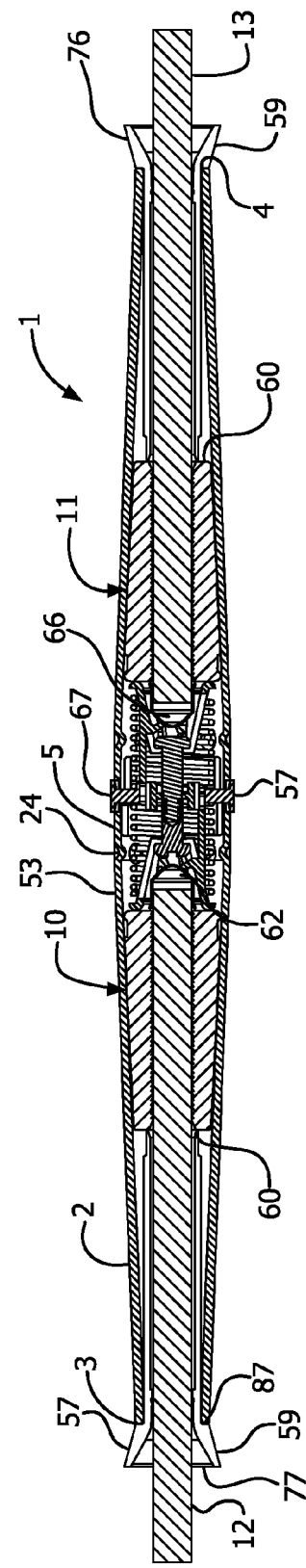
FIG. 28
FIG. 29

AUTOMATIC SPLICE HAVING A MAGNETIC INDICATOR

CROSS REFERENCE TO RELATED APPLICATION

This application claims the benefit under 35 U.S.C. §119(e) of U.S. Provisional Application Ser. No. 61/794,578, filed Mar. 15, 2013, which is hereby incorporated by reference in its entirety.

FIELD OF THE INVENTION

The present invention relates generally to a cable connector for electrically and mechanically connecting first and second cables. More particularly, the present invention relates to a cable connector indicating full insertion of first and second cables therein. Still more particularly, the present invention relates to a cable connector in which indicators are drawn into the connector by a magnet upon full insertion of first and second cables.

BACKGROUND OF THE INVENTION

Splicing connectors for electrical cables and conductors have long been known, and are used by utility linemen to quickly splice lengths of suspended cable together. The splicing connectors, commonly referred to as automatic splices, have become a mainstay in the electrical utility industry. Originally developed for "emergency restoration", automatic splices have evolved into a standard construction component for overhead power lines, and have been extensively used in the industry.

A problem associated with existing automatic splices is the lack of an indication that the electrical conductors have been fully inserted in the automatic splices. Without such indication, the conductors can be partially inserted, such that the conductors are not properly spliced together. Failure to fully insert a conductor in the splice can result in the conductor slipping out of the splice, which could take time to occur, thereby creating a highly dangerous environment. Accordingly, a need exists for an automatic splice that indicates that conductors have been fully inserted in the splice.

Another problem associated with existing automatic splices is that a large force is required to insert the conductors. The location of the automatic splice can make it difficult for the lineman to assert the required installation force, such that repeated efforts can be required to fully insert the conductors. An improperly inserted conductor can slip out of the splice, thereby creating a highly dangerous environment. Accordingly, a need exists for an automatic splice that reduces the insertion force required to insert conductors.

SUMMARY OF THE INVENTION

An object of the present invention is to provide an improved cable connector for electrically and mechanically connecting first and second cables.

Another object of the present invention is to provide a cable connector that indicates when first and second cables are fully inserted.

Still another object of the present invention is to provide a cable connector that reduces the force required to insert first and second cables.

The foregoing objectives are basically attained by a cable connector including body member having a first opening to receive a cable and a second opening. An indicator is received in the second opening and is movable between exposed and unexposed positions. A magnet is disposed in the body member and is aligned with the second opening. A support member is movable between first and second positions. When the support member is in the first position the support member is disposed between the magnet and the indicator such that the indicator is in the exposed position. When the support member is in the second position the support member is withdrawn from between the magnet and the indicator such that the magnet moves the indicator to the unexposed position to indicate full insertion of the cable.

The foregoing objectives are also basically attained by a cable connector including a body member having a first opening to receive a cable and a second opening. An indicator received in the second opening is movable between exposed and unexposed positions. A magnet disposed in the body member is aligned with the second opening. A centerstop is disposed in the body member. A support member is movable between first and second positions. When the support member is in the first position, the support member is disposed between the magnet and the indicator such that the indicator is in the exposed position. When the support member is in the second position, the support member is withdrawn from between the magnet and the indicator such that the magnet moves the indicator to the unexposed position to indicate full insertion of the cable. A spring member is disposed between the centerstop and the support member. The spring member is compressed when the support member is in the first position. The said spring member moves the support member from the first position to the second position when activated.

Other objects, advantages and salient features of the invention will become apparent from the following detailed description, which, taken in conjunction with the annexed drawings, discloses a preferred embodiment of the invention.

As used in this application, the terms "front," "rear," "upper," "lower," "upwardly," "downwardly," and other orientational descriptors are intended to facilitate the description of the exemplary embodiment of the present invention, and are not intended to limit the structure of the exemplary embodiment of the present invention to any particular position or orientation.

BRIEF DESCRIPTION OF THE DRAWINGS

The above aspects and features of the present invention will be more apparent from the description for the exemplary embodiment of the present invention taken with reference to the accompanying drawings, in which:

FIG. 2 is a perspective view of a tube of the cable connector of FIG. 1;

FIG. 3 is a side elevational view in cross-section of the tube of FIG. 2;

FIG. 6 is a perspective view of a centerstop of a centerstop assembly of the cable connector of FIG. 1;

FIG. 7 is a side elevational view of the centerstop of FIG. 6;

FIG. 8 is a top plan view of the centerstop of FIG. 6;

FIG. 28 is a top plan view of the cable connector of FIG. 1;

FIG. 29 is a side elevational view in cross-section of the cable connector of FIG. 28;

Throughout the drawings, like reference numerals will be understood to refer to like parts, components and structures.

DETAILED DESCRIPTION OF EXEMPLARY EMBODIMENT

Figure 1:
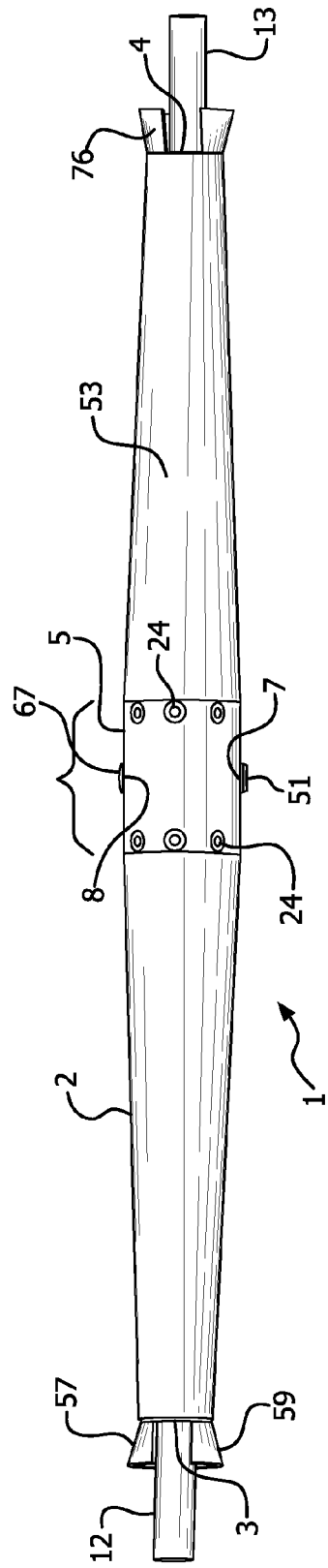
FIG. 1 is a side elevational view of a cable connector in accordance with an exemplary embodiment of the present invention during cable installation.

A cable connector 1 in accordance with an exemplary embodiment of the present invention includes a body member 2 having a first opening at a first end 3 to receive a first cable, or conductor, 12 and a second opening at a second end 4 to receive a second cable, or conductor, 13. An indicator 51 is received in a fastener opening 7 and is movable between exposed and unexposed positions. A magnet 46 is disposed in the body member 2 and is aligned with the fastener opening 7. A support member 34 is movable between first and second positions. When the support member 34 is in the first position the support member is disposed between the magnet 46 and the indicator 51 such that the indicator is in the exposed position. When the support member 34 is in the second position the support member is withdrawn from between the magnet 46 and the indicator 51 such that the magnet moves the indicator to the unexposed position to indicate full insertion of the cable 12.

The swaged tube, or body member, 2 has first and second ends 3 and 4, as shown in FIGS. 1-3. The tube 2 has a center portion 5 having a substantially constant diameter. The diameter of the tube 2 decreases and tapers inwardly from the center portion 5 towards each of the first and second ends 3 and 4. A cavity 6 is defined by the tube 2 between the first and second ends 3 and 4, as shown in FIG. 3. A plurality of dimples 24 extend inwardly from the center portion 5 of the tube. As shown in FIG. 1, first and second sets of the dimples extend circumferentially around the tube on opposite sides of first and second fastener openings 7 and 8. The tube is preferably made of aluminum, although any suitable material can be used.

The first and second fastener openings 7 and 8 are formed in the center portion 5 of the tube 2, as shown in FIGS. 1 and 3. The first and second fastener openings 7 and 8 are preferably counterbored, as shown in FIG. 3. Preferably, the first and second fastener openings 7 and 8 are diametrically opposed on an axis 9 through and substantially perpendicular to a longitudinal axis of the tube 2, as shown in FIG. 3. The fastener openings 7 and 8 extend through the tube 2 from an outer surface 53 to the cavity 6.

Figure 4:
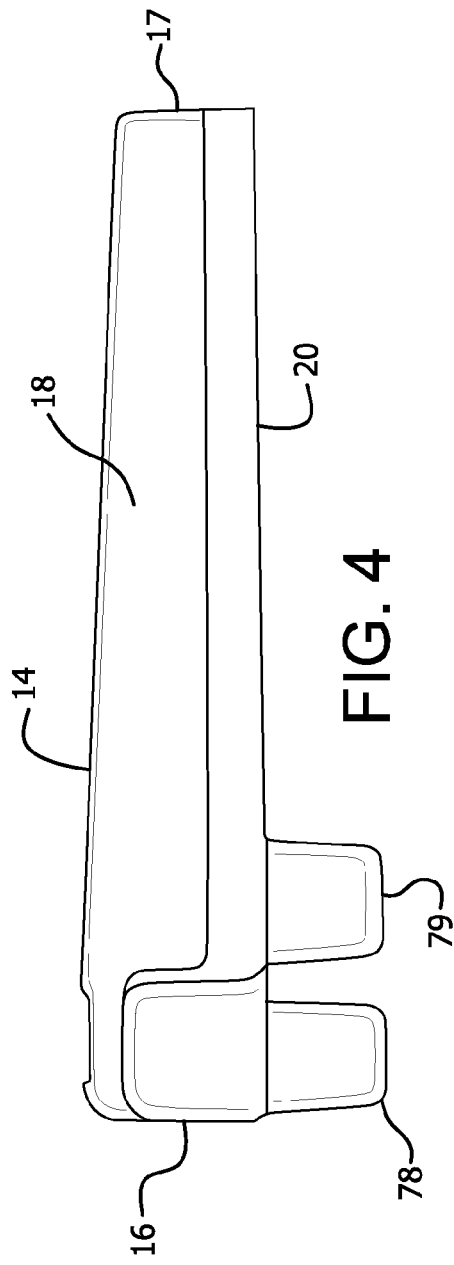
FIG. 4 is a side elevational view of a jaw member of a jaw assembly of the cable connector of FIG. 1.
Figure 5:
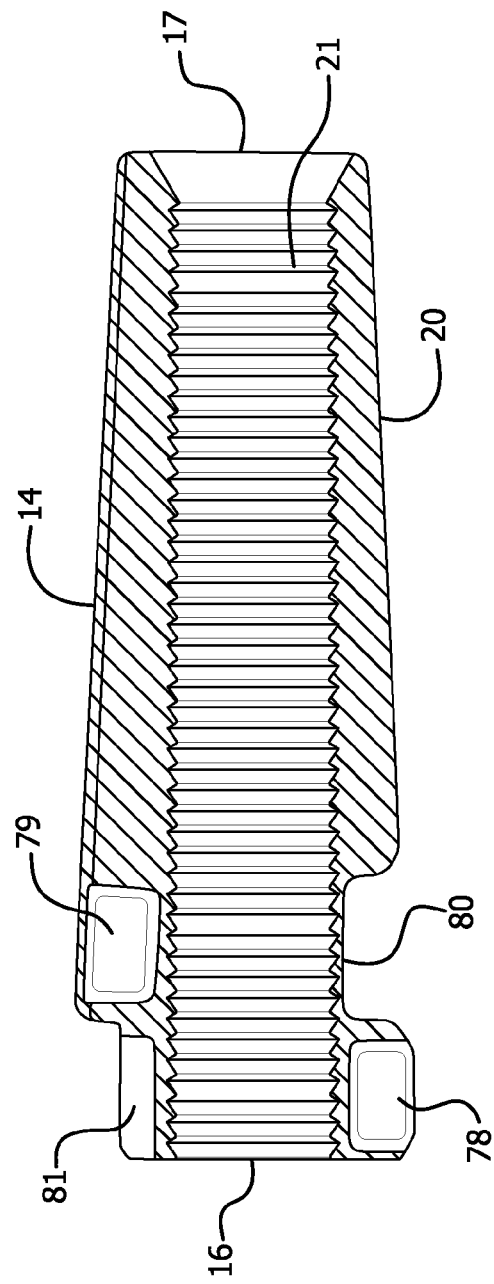
FIG. 5 is a top plan view in section of the jaw member of FIG. 4.

Gripping jaw assemblies 10 and 11 are disposed in the cavity 6 on opposite sides of the center portion 5 of the tube 2 for retaining the first and second cables 12 and 13, as shown in FIGS. 4, 5 and 28. The first and second jaw assemblies 10 and 11 are substantially identical. Each of the jaw assemblies 10 and 11 includes first and second jaw members 14 and 15, which are preferably substantially identical. The jaw member 14 has a first end 16 and a second end 17. An outer surface 18 of the jaw member 14 tapers inwardly from the first end 16 to the second end 17. An inner surface 20 of the jaw member 14 has teeth 21 to facilitate engaging the inserted cables 12 and 13. First and second tabs 78 and 79 are disposed on opposite sides of the teeth 21 of the jaw member 14 and extend outwardly from the inner surface 20. A first recess 80 is disposed rearwardly of the first tab 78, and a second recess 81 is disposed forwardly of the second tab 79. The tabs and recesses of the first jaw member 14 engage corresponding tabs and recesses of the second jaw member 15 to prevent relative axial movement therebetween. The jaw assemblies 10 and 11 retain the cables 12 and 13 in the tube 2 such that when a force is applied to retract the cables 12 and 13, the force of the jaw assemblies 10 and 11 increases as applied against the cables 12 and 13. The jaw members are preferably made of an aluminum alloy, although any suitable material can be used.

Figure 26:
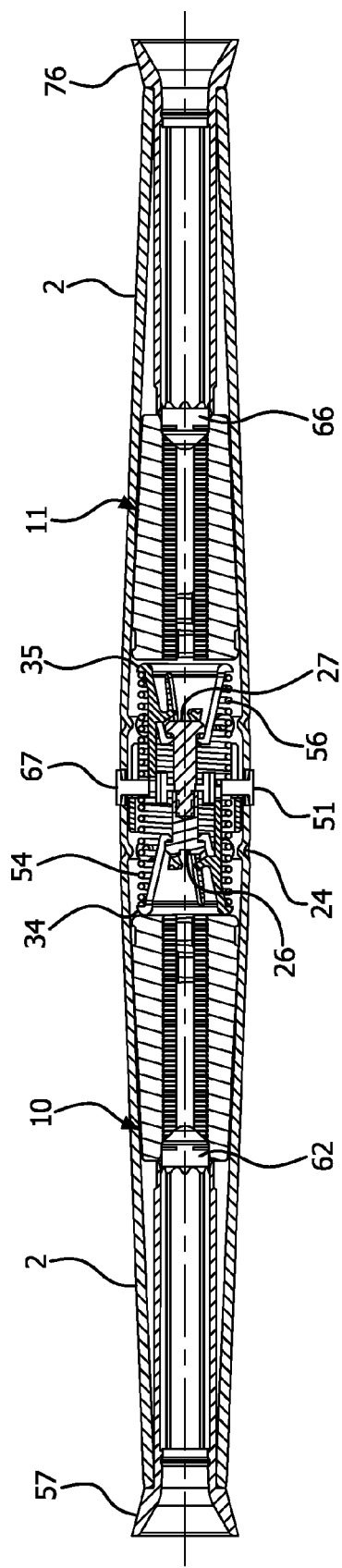
FIG. 26 is a side elevational view in cross-section of the cable connector prior to inserting a cable therein.
Figure 27:
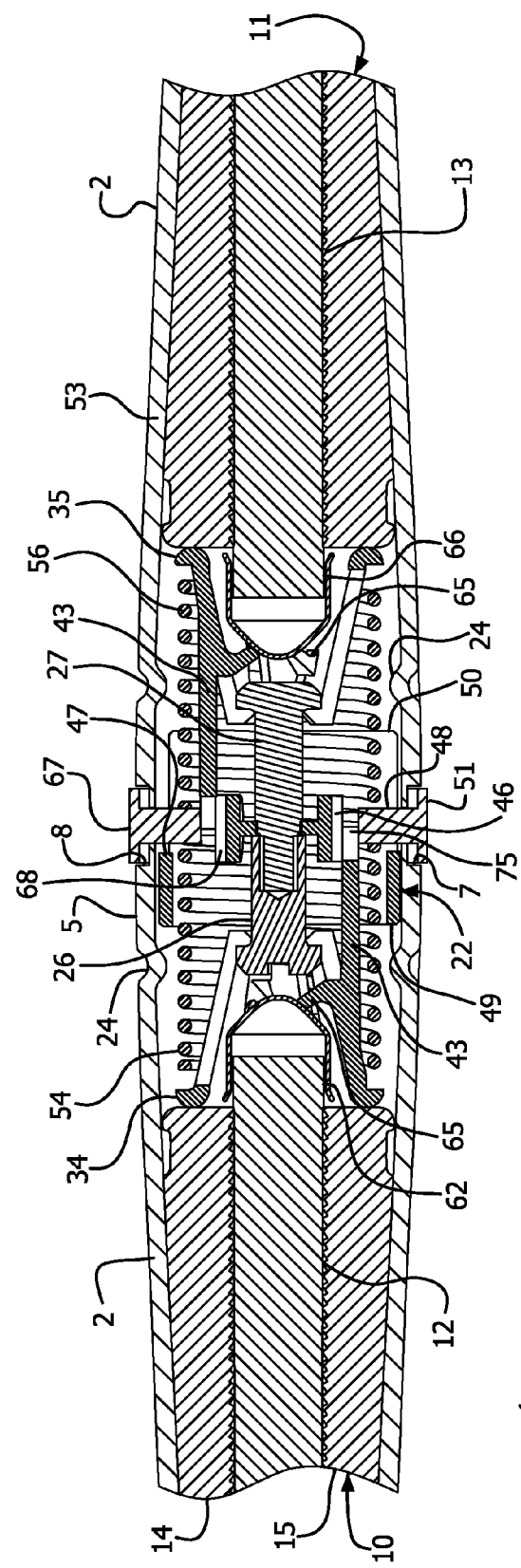
FIG. 27 is a partial side elevational view in cross-section of the cable connector of FIG. 1 receiving a centerstop assembly of FIG. 25.

A centerstop assembly 22 is disposed in the center portion 5 of the tube 2, as shown in FIGS. 26 and 27. The centerstop assembly 22 includes a centerstop 23, first and second ejectors 34 and 35, first and second inserts 26 and 27, first and second spring members 54 and 56 and magnets 46.

The centerstop 23, as shown in FIGS. 6-8, includes a wall 71 having a substantially circular transverse cross section. A base 72 is disposed within the wall 71 and extends substantially perpendicularly to a longitudinal axis of the centerstop 23. The base 72 is disposed between first and second ends 49 and 50 of the centerstop 23, and preferably substantially centrally disposed therebetween. First and second support members 44 and 45 are disposed adjacent a hole 25 in the base 72. The first and second support members 44 and 45 are preferably substantially planar and disposed on opposite sides of the hole 25 and are substantially perpendicular to the base 72. Diametrically opposed recesses 47 and 48 extend inwardly in the wall 71 toward the first end 49 from the second end 50 of the centerstop 23, as shown in FIGS. 6 and 7. The centerstop 23 is preferably made of plastic, although any suitable material can be used.

Figure 9:
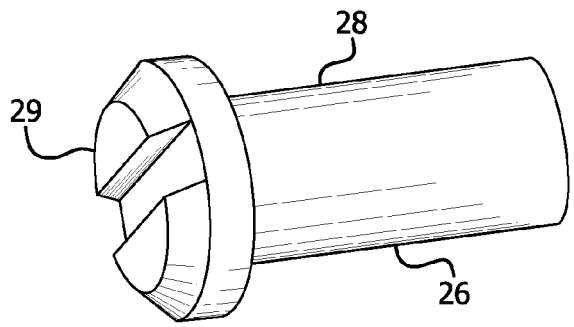
FIG. 9 is a front perspective view of a first insert of the centerstop assembly of the cable connector of FIG. 1.
Figure 10:
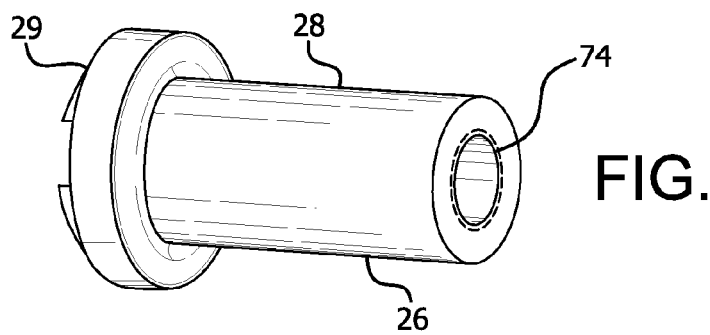
FIG. 10 is a rear perspective view of the first insert of FIG. 9.
Figure 11:
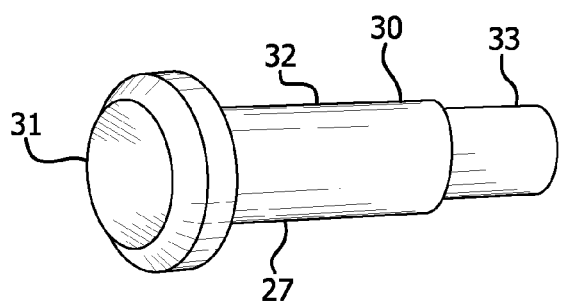
FIG. 11 is a front perspective view of a second insert of the centerstop assembly of the cable connector of FIG. 1.
Figure 12:
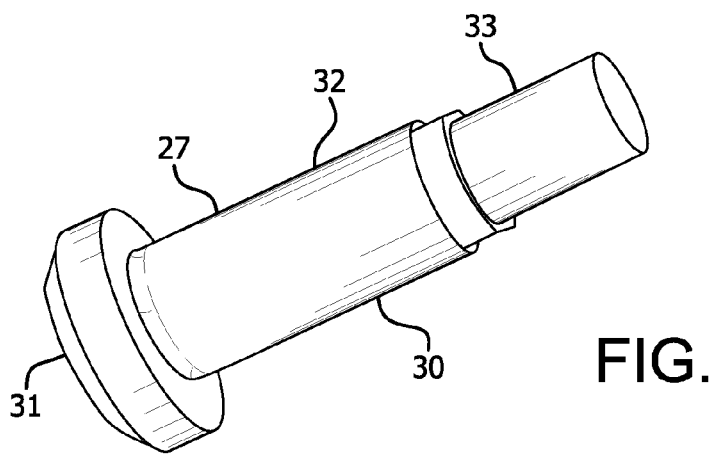
FIG. 12 is an rear perspective view of the second insert of FIG. 11.

The first insert 26, as shown in FIGS. 9 and 10, has a substantially cylindrical shaft 28 with a head 29 at an end thereof. The first insert shaft 28 has a bore 74 in an end opposite the head 29. The bore 74 is preferably threaded. The second insert 27, as shown in FIGS. 11 and 12, has a substantially cylindrical shaft 30 with a head 31 at an end thereof. The second insert shaft 30 has a first portion 32 and a second portion 33. The second portion 33 is preferably externally threaded. The first portion 32 has a larger diameter than the second portion 33 and is disposed between the second portion 33 and the head 31. The head 29 of the first insert 26 can have a slot therein, as shown in FIGS. 9 and 10, to facilitate connecting to the second insert 27. The first and second inserts 26 and 27 are preferably made of plastic, although any suitable material can be used.

The first and second ejectors, or support members, 34 and 35 are received in the cavity 6 of the tube 2, as shown in FIGS. 26, 27 and 29. The first and second ejectors 34 and 35 are substantially identical, such that the following description of the first ejector 34 shown in FIGS. 13-17 is applicable to the second ejector 35.

Figure 17:
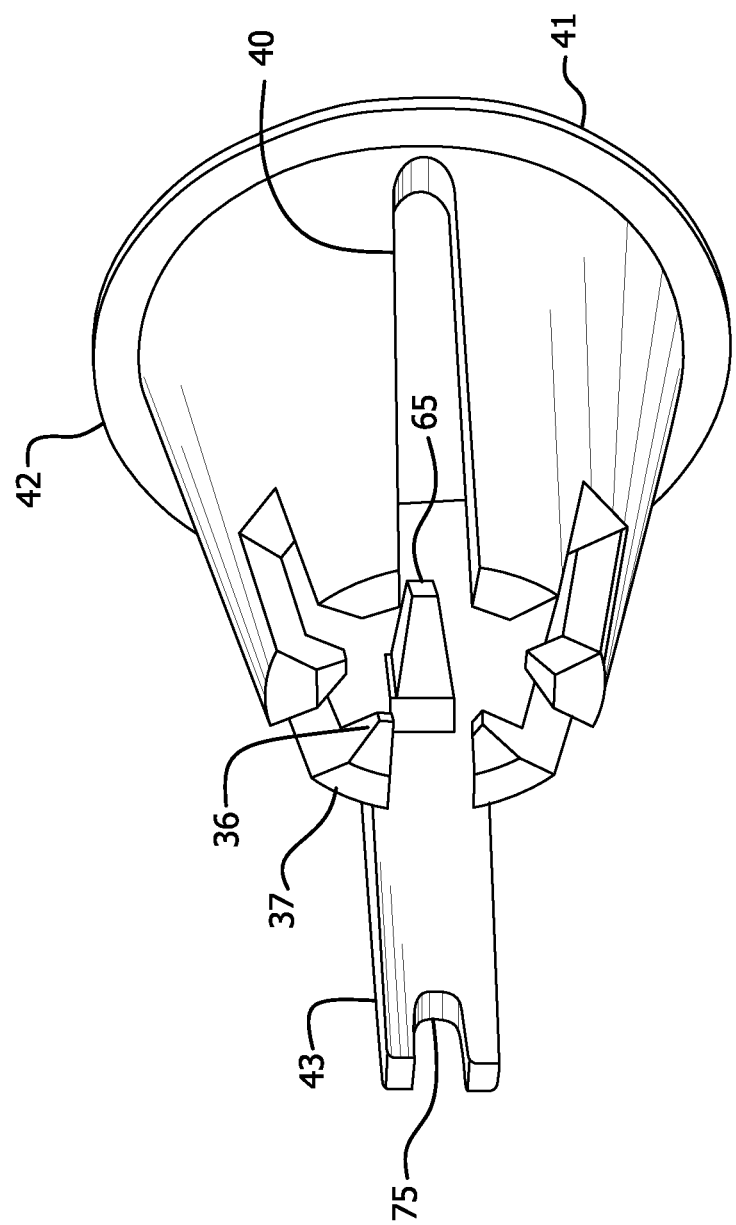
FIG. 17 is a perspective view of the ejector of FIG. 13.
Figure 23:
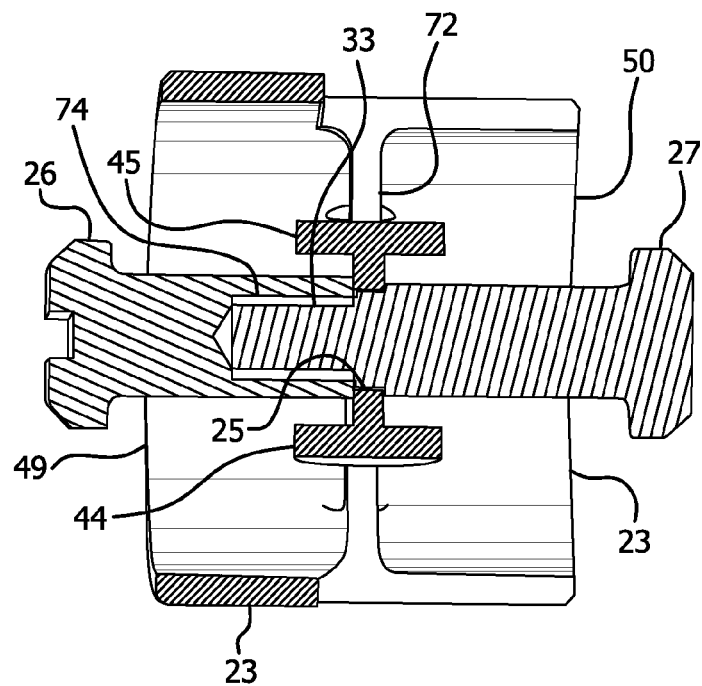
FIG. 23 is a side elevational view in cross-section of the centerstop receiving the first and second inserts.
Figure 24:
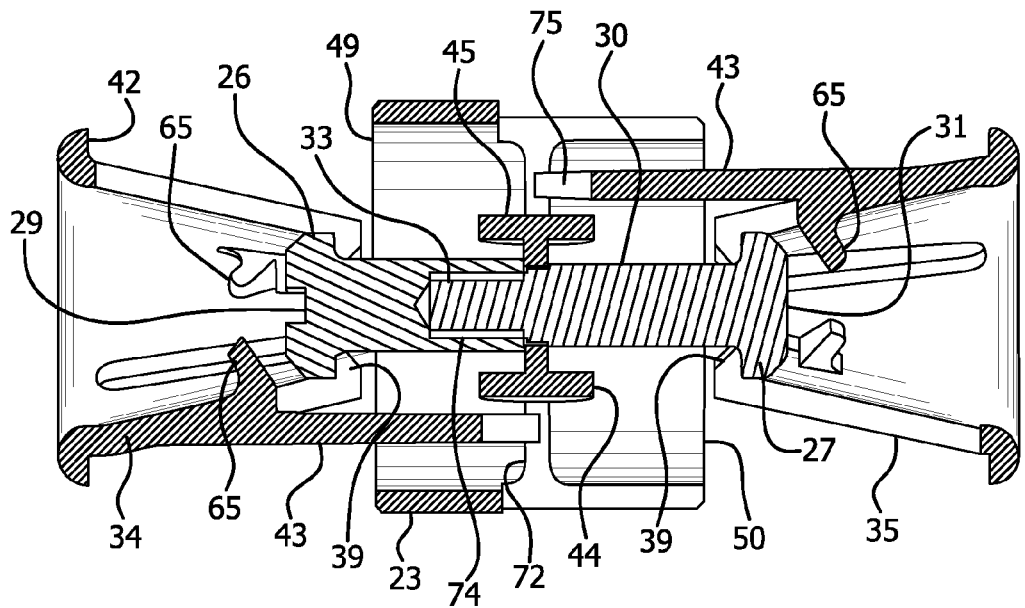
FIG. 24 is a side elevational view in cross-section of the centerstop of FIG. 23 receiving the first and second ejectors.

A first opening 36 is formed at a first end 37 of the ejector 34, as shown in FIG. 17. The first opening 36 is formed by a plurality of flex arms 38. Inwardly extending tabs 39 are disposed at free ends of the flex arms 38. The arms 38 flex to allow insertion of one of the first and second inserts 26 and 27. Fingers 65 extend inwardly from the flex arms 38 to facilitate flexing the arms 38. The arms 38 flex outwardly to allow the head of each insert to pass through the first opening 36. The tabs 39 prevent removal of the inserted head back through the first opening 36. The first ejector 34 receives the first insert 26, and the second ejector 35 receives the second insert 27, as shown in FIGS. 23 and 24.

Figure 13:
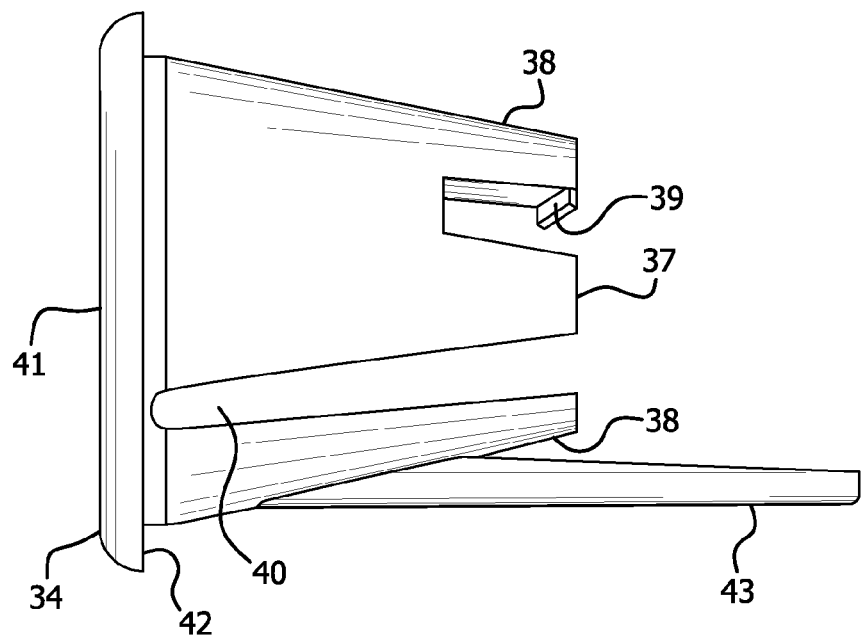
FIG. 13 is a side elevational view of an ejector of the cable connector of FIG. 1.
Figure 14:
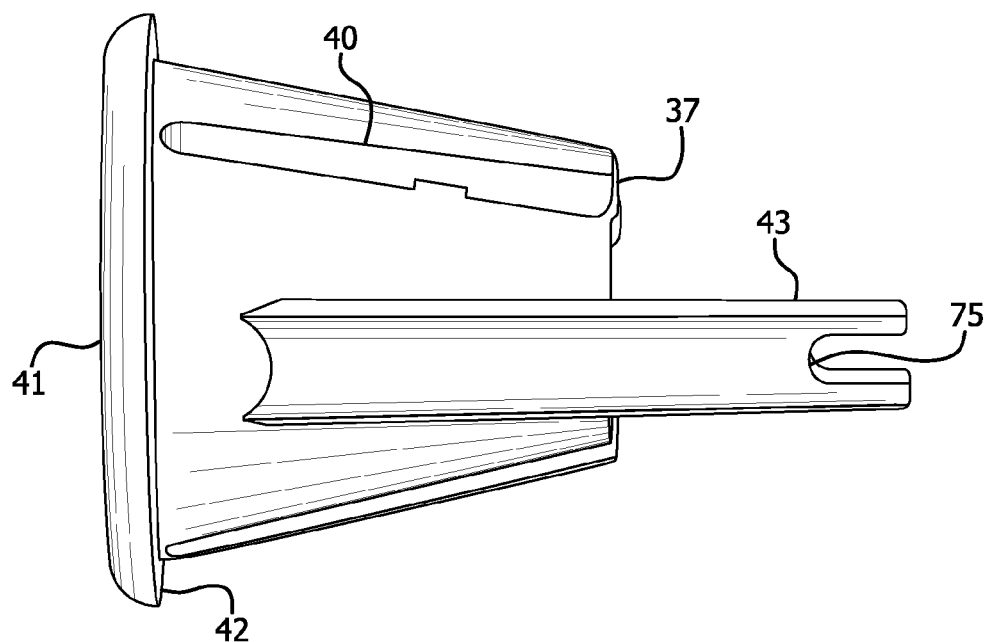
FIG. 14 is a bottom plan view of the ejector of FIG. 13.
Figure 15:
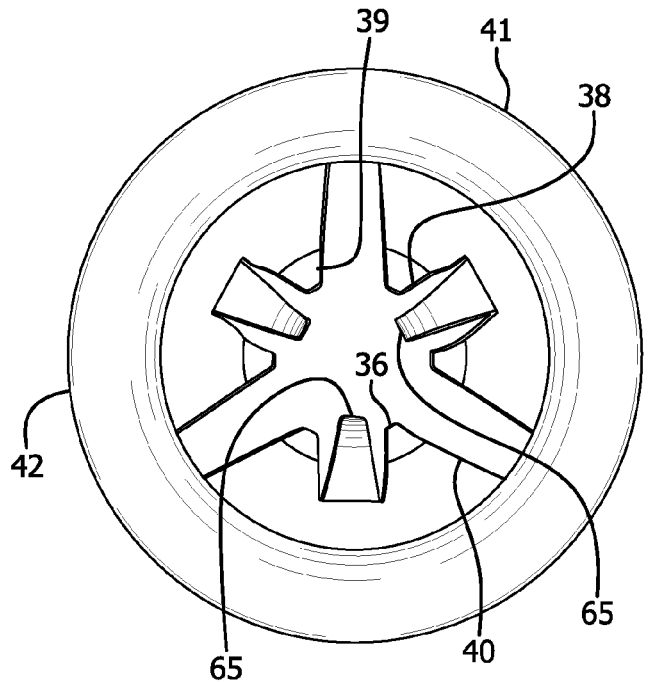
FIG. 15 is a front elevational view of the ejector of FIG. 13.
Figure 16:
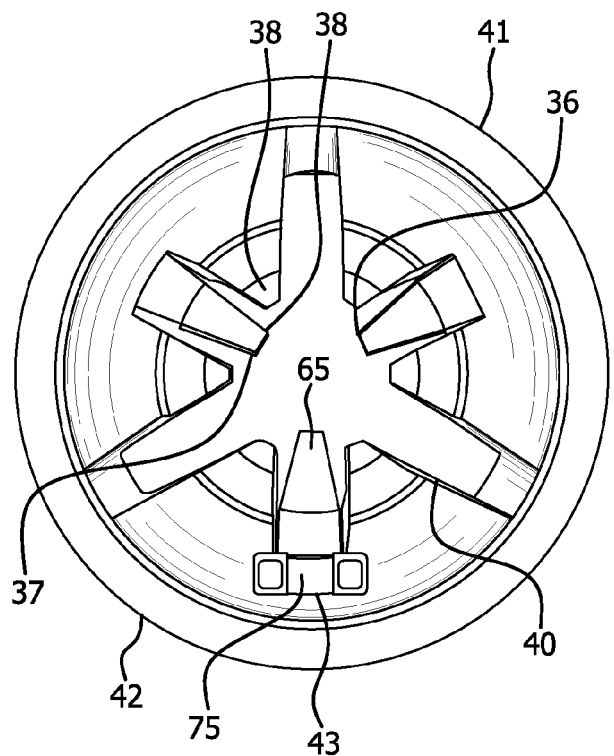
FIG. 16 is a rear elevational view of the ejector of FIG. 13.

The ejector 34 preferably has a substantially frusto-conical shape, as shown in FIGS. 13 and 14. A plurality of recesses 40 extend from the first end 37 of the ejector toward the second end 41 to facilitate flexing the arms 38. A lip 42 is formed at the second end 41 of the ejector 34. A rearwardly extending arm 43 extends from the ejector 34 beyond the first end 37, as shown in FIGS. 13, 14 and 17. A recess 75 is formed in a free end of the arm 43. The first and second ejectors 34 and 35 are preferably made of plastic, although any suitable material can be used.

Figure 18:
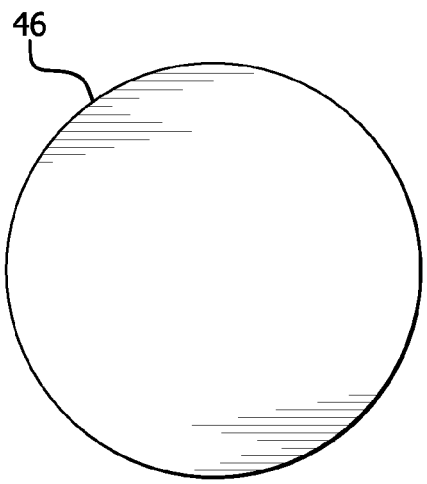
FIG. 18 is a front elevational view of a magnet of the cable connector of FIG. 1.

First and second magnets 46 and 68 are connected to the first and second support members 44 and 45, respectively, of the centerstop 23. Preferably, the first and second magnets 46 and 68 are substantially identical. The magnets 46 and 68, as shown in FIG. 18, are preferably substantially circular. The magnets 46 and 68 are preferably made of neodymium having a nickel-copper-nickel coating, i.e., alternating layers of nickel, copper and nickel.

Figure 19:
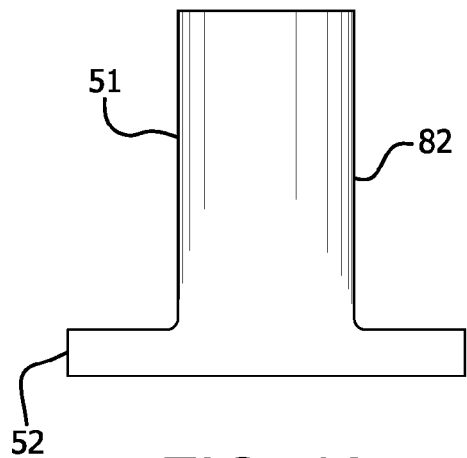
FIG. 19 is a front elevational view of a rivet of the cable connector of FIG. 1.

First and second rivets 51 and 67 are received by the first and second openings 7 and 8 in the center portion 5 of the tube 2, as shown in FIG. 1. The first and second rivets 51 and 67 are preferably substantially identical. A rivet 51, as shown in FIG. 19, has a head 52 connected to a shaft 82. The head 52 is preferably substantially perpendicular to the shaft 82. The rivet 51 is preferably made of magnetizable steel and uniformly formed as a single piece.

Figure 20:
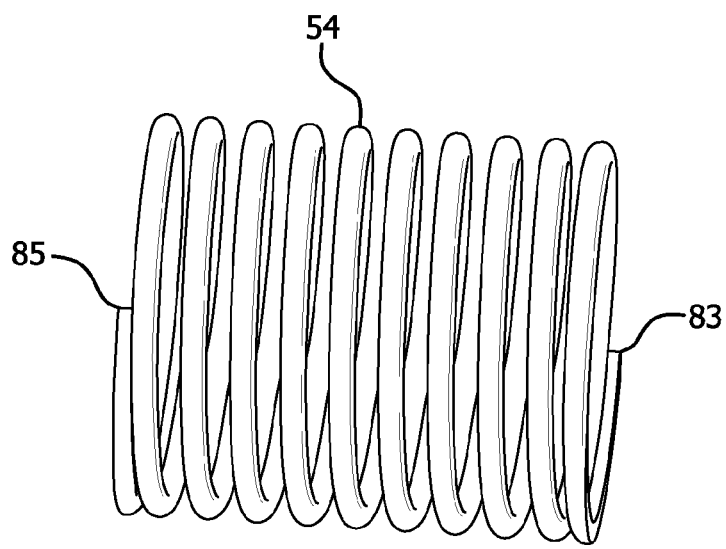
FIG. 20 is a perspective view of a spring member of the cable connector of FIG. 1.
Figure 25:
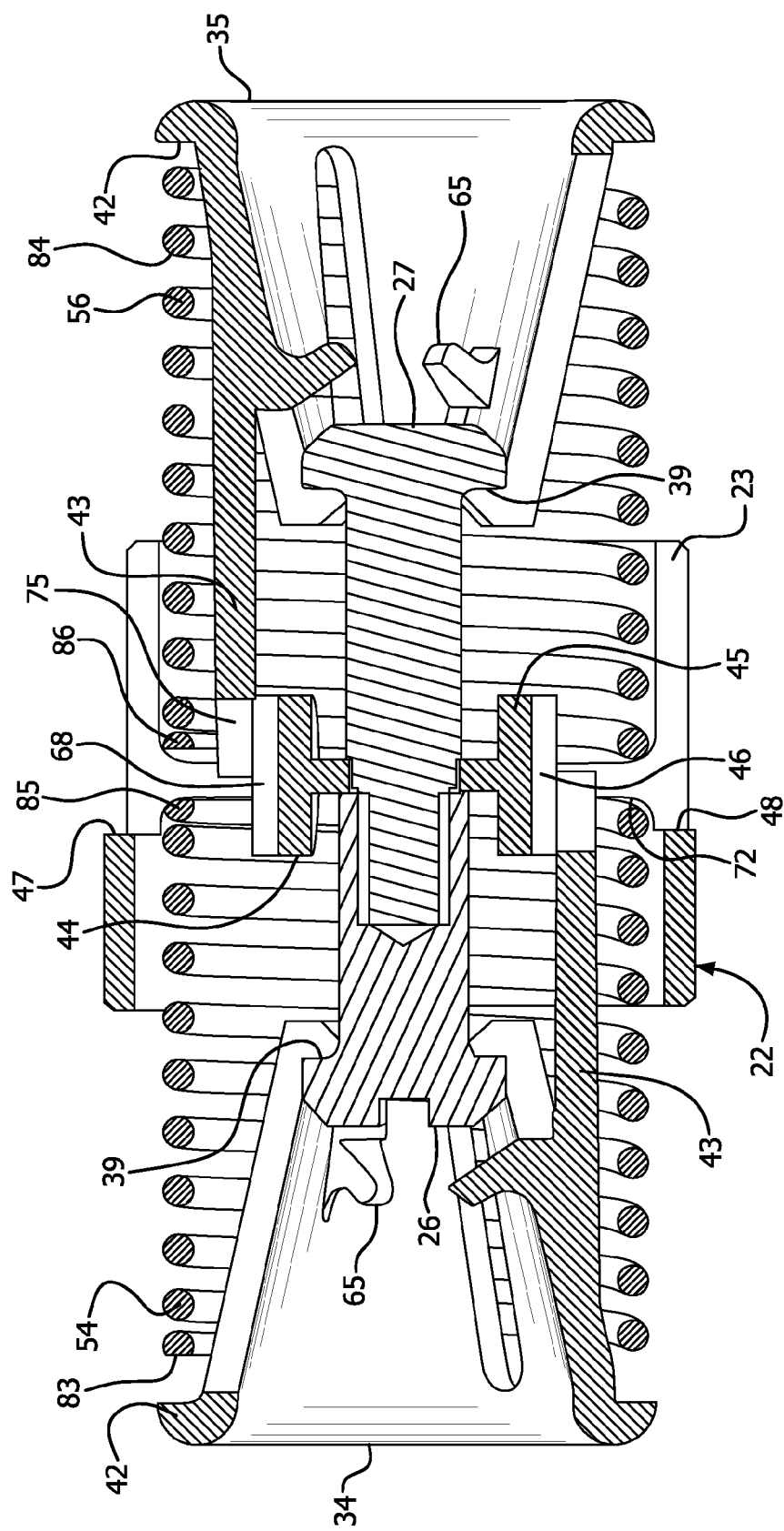
FIG. 25 is a side elevational view in cross-section of the centerstop of FIG. 24 receiving first and second spring members and first and second magnets.

First and second spring members 54 and 56, as shown in FIG. 20, are disposed between each of the ejectors 34 and 35 and the centerstop 23, as shown in FIG. 25. The first and second spring members 54 and 56 are preferably substantially identical. First ends 83 and 84 of the spring members 54 and 56 abut the lips of the ejectors 34 and 35. Second ends 85 and 86 of the spring members 54 and 56 abut opposite sides of the base 72 of the centerstop 23. Preferably, the first and second spring members 54 and 56 are helical springs. The spring members 54 and 56 are preferably made of metallic coated carbon steel, although any suitable material can be used.

Figure 21:
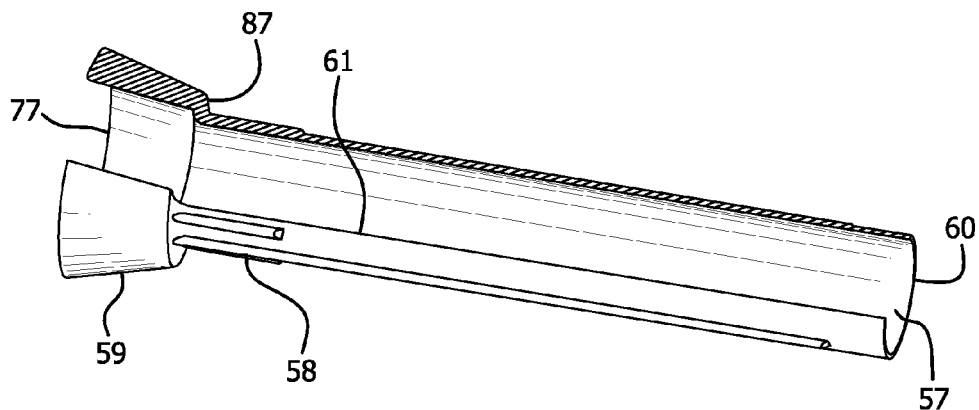
FIG. 21 is a perspective view in partial cross-section of a funnel guide of the cable connector of FIG. 1.

First and second funnel guides 57 and 76 are disposed on opposite sides of the center portion 5 of the tube 2, as shown in FIGS. 1 and 28-31. The second funnel guide 76 is substantially identical to the first funnel guide 57. The funnel guide 57 has a tubular portion 58 and a substantially frusto-conical end portion 59 connected thereto, as shown in FIG. 21. A shoulder 87 is formed between the tubular portion 58 and the substantially frusto-conical end portion 59. The tubular portion 58 is disposed in the cavity 6 of the tube 2, as shown in FIG. 29, such that the shoulder 87 abuts the end 3 of the tube 2. A first end 60 of the tubular portion 58 is disposed in the cavity 6 proximal the second ends 18 and 19 of the jaw assemblies 10 and 11, as shown in FIG. 29. A slot or window 61 extends from the first end 60 to a second end 77 of the funnel guide 57, as shown in FIG. 21. The window 61 facilitates removal of the funnel guide 57 when it is pushed out of the tube 2 of the automatic splice 1 after cables 12 and 13 are fully inserted. The funnel guides 57 and 76 are open-ended to allow the cables 12 and 13 to pass therethrough during installation. The funnel guides 57 and 76 are pushed outside the tube 2 after full insertion of the cables 12 and 13 to provide further visual indicator of a successful insertion. Preferably, the funnel guides 57 and 76 are made of plastic, although any suitable material can be used, and are unitarily formed as a single piece.

Figure 22:
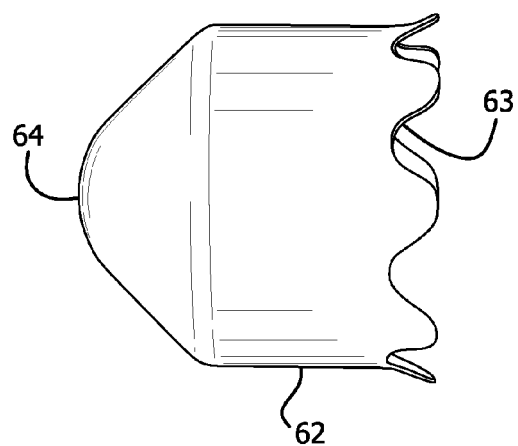
FIG. 22 is a side elevational view of a pilot cup.

First and second pilot cups 62 and 66 are disposed in the cavity 6 of the tube 2 to receive the first and second cables 12 and 13, as shown in FIGS. 26 and 27. The first and second pilot cups 62 and 66 are preferably substantially identical. The first pilot cup 62 is preferably a substantially hemispherically shaped or nosed cylinder having an open end 63 and a closed end 64, as shown in FIG. 22. The pilot cups 62 and 66 are preferably made out of stainless steel or plastic and are unitarily formed as a single piece.

Assembly and Operation

The assembled automatic splice, or cable connector, 1 is shown in FIGS. 1 and 26-32. Prior to fully inserting cables, or conductors, 12 and 13, the first and second rivets, or indicators, 51 and 67 extend outwardly from the outer surface 53 of the center portion 5 of the tube 2, thereby indicating that the cables 12 and 13 are not fully inserted, as shown in FIGS. 26 and 27. Additionally, the conical end portions 59 of the first and second funnel guides 57 and 76 abut the ends 3 and 4 of the tube 2, thereby further indicating that the cables 12 and 13 are not fully inserted.

Assembly of the centerstop assembly 22 is shown in FIGS. 23-25. The first insert 26 is disposed in the centerstop 23 such that the bore 74 is aligned with the opening 25 in the base 72 of the centerstop 23. The second portion 33 of the shaft 30 of the second insert 27 is inserted through the centerstop opening 25 and in the bore 74 of the first insert 26 from the opposite side of the base 72, as shown in FIG. 23. The second portion 33 of the shaft 30 of the second insert 27 is preferably threadably received by the threaded bore 74 of the first insert 26. Alternatively, the second portion 33 of the shaft 30 of the second insert 27 can received by the bore 74 of the first insert 26 by an interference fit, such as a press fit or friction fit, although the first and second inserts 26 and 27 can be connected by any suitable means. As shown in FIG. 25, the first and second inserts 26 and 27 engage the base 72 of the centerstop 23, thereby securing the centerstop to the inserts.

The first and second ejectors 34 and 35 are snapped over the heads 29 and 31 of the first and second inserts 26 and 27, as shown in FIG. 24. The arms 38 of the ejectors 34 and 35 are flexed outwardly such that the heads 29 and 31 of the first and second inserts 26 and 27 are received in the opening 36 in the first end 37 of the ejectors. The arm tabs 39 engage the heads 29 and 31 to prevent removal of the inserts 26 and 27 from the ejectors 34 and 35.

The ejector arms 43 of each ejector 34 and 35 extend toward the support members 44 and 45, as shown in FIG. 24. As shown in FIG. 25, the first and second magnets 46 and 68 are disposed on an outer surface of each of the support members 44 and 45. The magnets 46 and 68 can be secured to the support members 44 and 45 in any suitable manner, such as the magnets being self-adhesive. The free ends of the ejector arms 43 overlie the magnets 46 and 68 such that the recesses 75 are disposed over the magnets 46 and 68.

Prior to engaging the first and second ejectors 34 and 35 with the first and second inserts 26 and 27, the first and second spring members 54 and 56 are inserted in the centerstop 23 from opposite sides, as shown in FIG. 25. The first spring member 54 extends between the lip 42 of the first ejector 34 and the base 72 of the centerstop 23. The second spring member 56 extends between the lip 42 of the second ejector 35 and the base 72 of the centerstop 23. The first and second spring members 54 and 56 are compressed when the first and second ejectors 34 and 35 are connected to the first and second inserts 26 and 27.

The assembled centerstop assembly 22 is inserted in the tube 2, as shown in FIGS. 26 and 27. The plurality of inwardly extending dimples 24 in the center portion 5 of the tube 2 facilitate locating the centerstop 23 in the cavity 6. The first end 49 of the centerstop 23 is adjacent the first set of dimples 24, and the second end 50 of the centerstop is adjacent the second set of dimples 24. The dimples 24 also prevent movement of the centerstop assembly 22 out of the center portion 5 of the tube 2.

The centerstop recesses 47 and 48 are aligned with the fastener openings 7 and 8 in the tube 2, as shown in FIG. 26. The first and second rivets 51 and 67 are disposed in each of the fastener openings 7 and 8 in the tube 2. Prior to inserting a cable, the rivets 51 rest on the ejector arms 43 such that the heads 52 of the first and second rivets 51 and 67 extend beyond the outer surface 53 of the tube 2. Accordingly, the rivet heads 52 projecting beyond the outer surface 53 of the tube 2 indicate that the cables 12 and 13 have not been fully inserted in the automatic splice 1. The rivets 51 and 67 are secured in the extended position by the first and second magnets 46 and 68, which emit magnetic fields that pass through the recesses 75 at the free ends of each of the ejector arms 43. As shown in FIGS. 26 and 27, the first magnet 46 retains the first rivet 51 in the extended position through the recess 75 in the arm 43 of the first ejector 34. The second magnet 68 retains the second rivet 67 in the extended position through the recess 75 in the arm 43 of the second ejector 35. The ends of the rivets 51 and 67 can rest on the free ends of the ejector arms 43.

The jaw assemblies 10 and 11 are then inserted in the cavity 6. The jaw assemblies 10 and 11 taper inwardly toward the first and second ends 3 and 4 of the tube 2, respectively. The first tabs 78 of the first and second jaw members 14 and 15 engage the corresponding recesses 81 of the other jaw member, and the second tabs 78 of the first and second jaw members 14 and 15 engage the corresponding recesses 80 of the other jaw member such that the jaw assemblies 10 and 11 move together through the cavity 6 of the tube 2. The tube 2 of the connector 1 is then formed around the jaw assemblies 10 and 11 such that the tube tapers toward the first and second ends 3 and 4 from the center portion 5.

The first and second pilot cups 62 and 66 are pre-assembled in ends 60 of the first and second funnel guides 57 and 76, as shown in FIG. 26. The first and second funnel guides 57 and 76, with the first and second pilot cups 62 and 66, are then inserted in the cavity 6 of the tube through 2 the first and second ends 3 and 4, as shown in FIG. 26, such that the frusto-conical end portions 59 abut the ends 3 and 4 of the tube 2. In the first, or initial, position before receiving a cable, the pilot cups 62 and 66 are disposed in the tube cavity 6 between the jaw members of the jaw assemblies 10 and 11, thereby keeping the jaw assemblies open, as shown in FIG. 26. The funnel guides 57 and 76 are open-ended to allow the cables 12 and 13 to pass therethrough.

The first cable 12 is inserted in the connector 1 through the open end 3 of the tube 2, as shown in FIGS. 27-32. The first cable 12 penetrates the first funnel guide 57 and engages the open end 63 of the first pilot cup 62 disposed in the first end 60 thereof. Once the first cable 12 and the pilot cup 62 are engaged, the pilot cup 62 nests against the end of the cable such that the open end 63 surrounds the cable and keeps the individual strands of the cable from separating. A small force is required to push the first cable 12 into the pilot cup 62 and advance the closed end 64 towards the center of the connector 1, transporting the first cable 12 towards a center of the tube 2.

The first cable 12 is then pushed with the first pilot cup 62 through the length of the first jaw assembly 10. As the first pilot cup 62 is pushed toward the center of the tube 2, the first pilot cup passes over the internal fingers 65 of the first ejector 34. The pilot cup 62 passing over the internal fingers 65 of the first ejector 34 causes the ejector arms 38 to flex outwardly, thereby being released from the first insert 26. The loaded first spring member 54 then pushes the first ejector 54 and the first jaw assembly 10 into the tapered portion of the tube 2.

Figure 31:
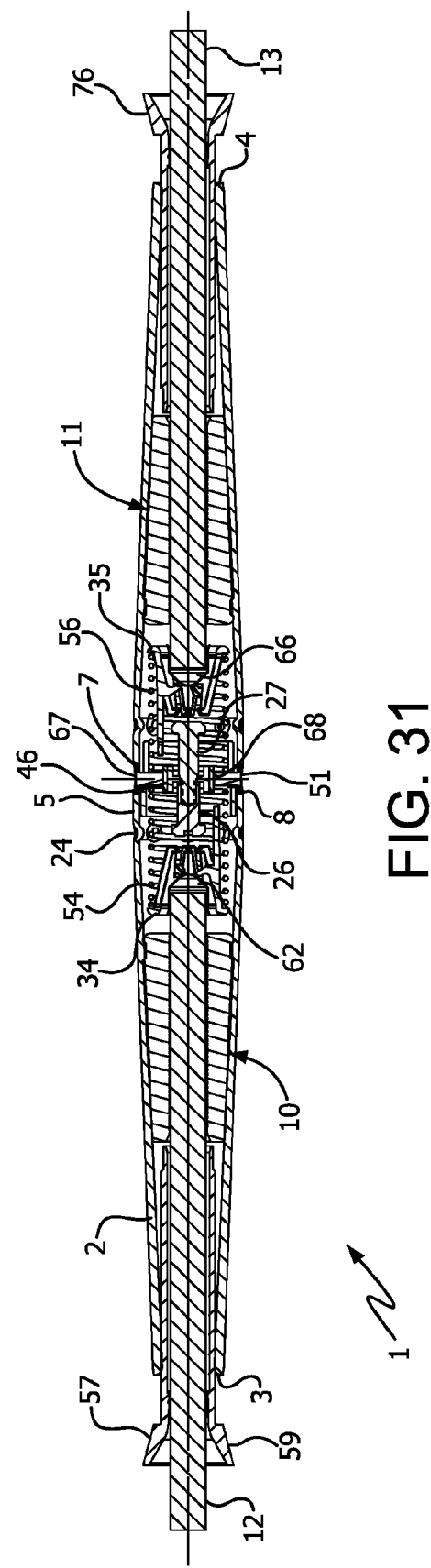
FIG. 31 is a side elevational view in cross-section of the cable connector of FIG. 30.
Figure 32:
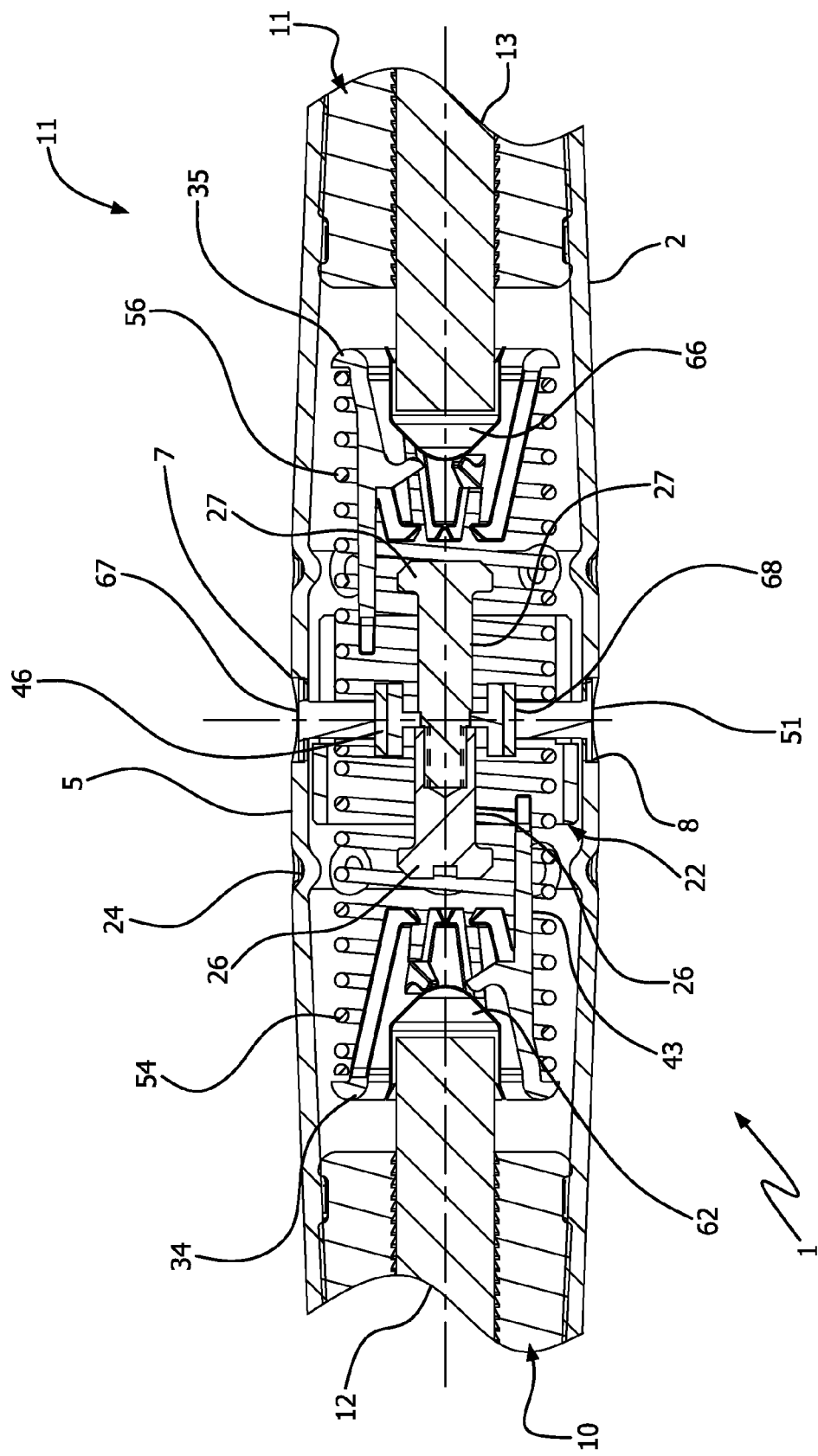
FIG. 32 is a partial side elevational view in cross-section of the cable connector of FIG. 31.

As the ejector 34 is moved by the first spring member 54 toward the first end 3 of the tube 2, the arm 43 of the first ejector 34 is moved from between the first magnet 46 and the first rivet 51, as shown in FIGS. 31 and 32. Accordingly, the first magnet 46 pulls the first rivet 51 into the first fastener opening 7 such that the first rivet 51 is no longer visible to the installer, thereby indicating full insertion of the first cable 12. The first fastener opening 7 is preferably counterbored to facilitate receiving the first rivet 51.

The first jaw assembly 10 is urged toward the tapered end of the tube 2 by the first spring member 54 and the first ejector 34 such that the jaw members 14 and 15 of the first jaw assembly move toward one another and increase the force applied on the first cable 12, thus increasing clamping forces on the first cable 12. The first spring member 54 biases the first jaw assembly 10 toward the first end 3 of the splice connector 1. Additionally, the jaw members 14 and 15 have an inner cable gripping surface 21 with grip enhancing features, such as a series of teeth, or other surface texture, which bite into the opposed surface of the cable or conductor.

Figure 30:
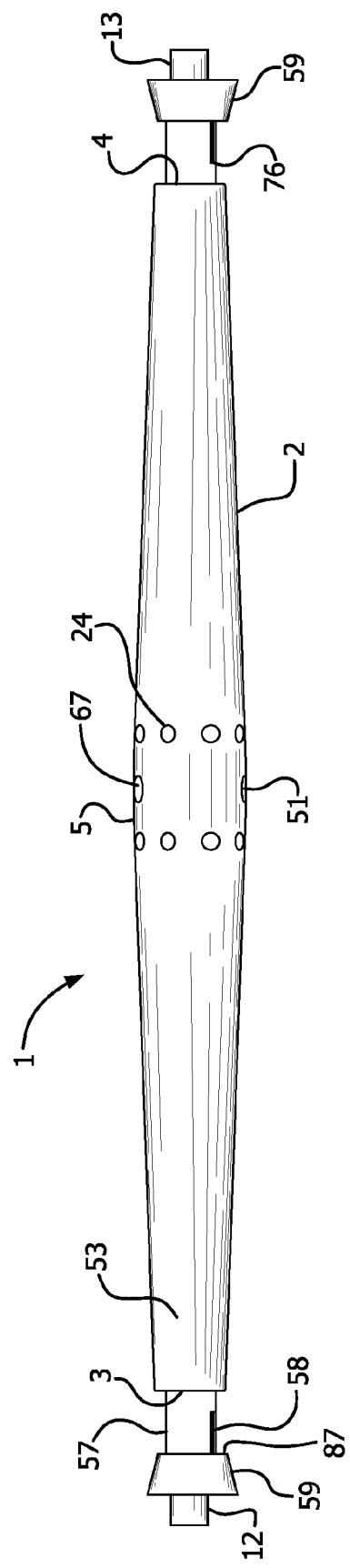
FIG. 30 is a side elevational view of the cable connector of FIG. 1 after fully inserting first and second cables.

The movement of the first jaw assembly 10 toward the end 3 of the tube 2 causes the first funnel guide 57 to move further out of the tube 2 to further indicate that the cable 12 is fully inserted. The tapered end of the first jaw assembly 10 strikes the first end 60 of the first funnel guide 57, thereby pushing the first funnel guide out of the tube 2 to further indicate full insertion of the first cable 12, as shown in FIGS. 30 and 31. The first funnel guide 57 is pushed out of the first end 3 of the tube 2 such that the frusto-conical portion 59 is spaced from the first end 3 of the tube 2. The window 61 in the first funnel guide 57 allows the first funnel guide to then be removed from the fully inserted first cable 12.

Insertion of the second cable 13 is accomplished in a substantially identical manner as the first cable 12. The second cable 13 is inserted such that the second ejector 35 is released from the second insert 27. The second spring member 56 pushes the second ejector 35, the second jaw assembly 11 and the second funnel guide 76 toward the second end 4 of the tube 2, as shown in FIGS. 30 and 31. The arm 43 of the second ejector 35 is removed from between the second magnet 68 and the second rivet 67, such that the second rivet is drawn toward the second magnet. The head 52 of the second rivet 67 is received within the second opening 8 such that the second rivet is no longer visible to the installer, thereby indicating full insertion of the second cable 13. Additionally, the second funnel guide 76 is pushed out of the second end 4 of the tube 2, such that the frusto-conical portion 59 is spaced from the second end 4 of the tube 2, as shown in FIGS. 30 and 31. The window 61 in the second funnel guide 76 allows the second funnel guide to then be removed from the fully inserted second cable 13.

While an advantageous embodiment has been chosen to illustrate the invention, it will be understood by those skilled in the art that various changes and modifications may be made therein without departing from the scope of the invention as defined in the appended claims and their equivalents.

What is claimed is:

1. A cable connector, comprising:
 a body member having a first opening to receive a cable and a second opening;
 an indicator received in said second opening and movable between exposed and unexposed positions in respect to said body member;
 a magnet disposed in said body member and aligned with said second opening; and
 a support member movable between first and second positions, when said support member is in said first position said support member is disposed between said magnet and said indicator such that said indicator is in said exposed position, and when said support member is in said second position said support member is withdrawn from between said magnet and said indicator such that said magnet moves said indicator to said unexposed position to indicate full insertion of the cable.

2. The cable connector according to claim 1, wherein said support member has a recess therein to facilitate securing said indicator in said exposed position when said support member is in said first position.

3. The cable connector according to claim 1, wherein a spring member moves said support member from said first position to said second position.

4. The cable connector according to claim 1, wherein a funnel guide has a substantially frusto-conical portion disposed externally of said body member and a substantially tubular portion disposed in said body member.

5. The cable connector according to claim 4, wherein said funnel guide is removable from said body member when said substantially frusto-conical portion is spaced from said end of said body member.

6. The cable connector according to claim 4, wherein said funnel guide has an axially extending window to facilitate removal of said funnel guide from said body member.

7. The cable connector according to claim 1, wherein said support member is removably connected to a centerstop, said support member being connected to said centerstop when said support member is in said first position and said support member being disconnected from said centerstop when said support member is in said second position.

8. The cable connector according to claim 1, wherein movement of said indicator between said exposed and unexposed positions is in a first direction substantially perpendicular to a second direction in which said support member between said first and second positions.

9. A cable connector according, comprising: a body member having a first opening to receive a cable and a second opening; an indicator received in said second opening and movable between exposed and
 unexposed positions in respect to said body member;
 a magnet disposed in said body member and aligned with said second opening;
 a centerstop disposed in said body member; a support member movable between first and second positions, when said support member is in said first position said support member is disposed between said magnet and said indicator such that said indicator is in said exposed position, and when said support member is in said second position said support member is withdrawn from between said magnet and
 said indicator such that said magnet moves said indicator to said unexposed position to indicate full insertion of the cable; and
 a spring member disposed between said centerstop and said support member, said spring member being compressed when said support member is in said first position, and said spring member moving said support member from said first position to said second position when activated.

10. The cable connector according to claim 9, wherein said support member has a recess therein to secure said indicator in said exposed position when said support member is in said first position.

11. The cable connector according to claim 9, wherein said spring member is activated when the cable passes into said support member.

12. The cable connector according to claim 9, wherein movement of said support member from said first position to said second position moves a jaw assembly into a tapered portion of said body member to securely retain the cable in said cable connector.

13. The cable connector according to claim 9, wherein an insert connected to said centerstop engages said support member when said support member is in said first position, and said support member releases said insert when said support member is in said second position.

14. The cable connector according to claim 13, wherein said support member has a plurality of flexible arms engaging said insert when said support member is in said first position.

15. The cable connector according to claim 14, wherein said plurality of flexible arms are flexed outwardly when the cable passes into said support member such that said plurality of flexible arms release said insert.

16. The cable connector according to claim 9, wherein said support member moves along a longitudinal axis of said body member.

17. The cable connector according to claim 9, wherein a plurality of protrusions extending inwardly from said body member substantially prevent axial movement of said centerstop.

18. The cable connector according to claim 9, wherein said magnet is connected to said centerstop.

19. A cable connector, comprising: a body member having a first opening to receive a cable and a second opening; a jaw assembly positioned in said body member; an indicator received in said second opening and movable between an exposed position and an unexposed position in respect to said body member; and
- a magnet disposed in said body member to move said indicator from the exposed position to the unexposed position to indicate insertion of a cable.

20. The cable connector according to claim 19, further comprising
- a centerstop positioned in said body member;
- a first insert extending through said centerstop;
- a second insert connected to said first insert; and
- a first ejector removably connected to said first insert.

\* \* \* \* \*